Figure 1:
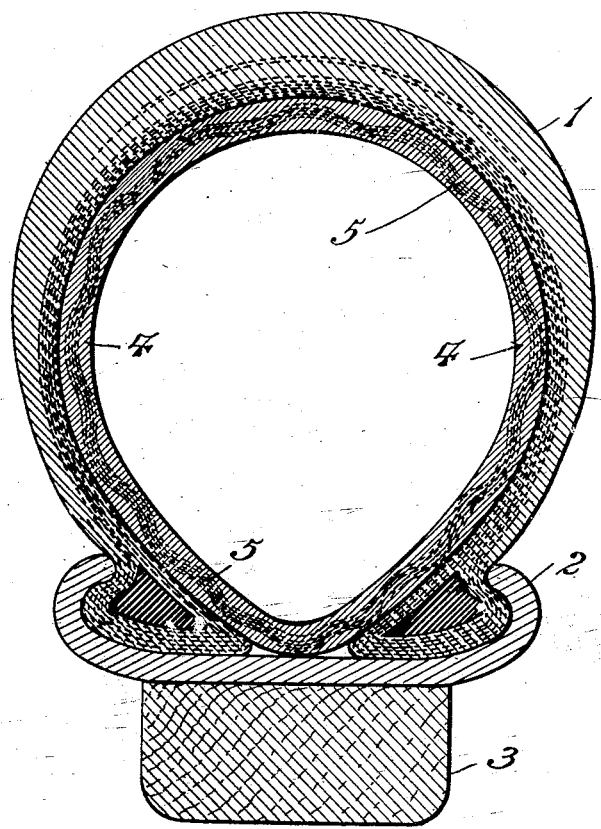

A. DOW.
PNEUMATIC TIRE.
APPLICATION FILED JULY 16, 1913.

1,120,915.

Patented Dec. 15, 1914.
2 SHEETS—SHEET 1.

Witnesses:
Edward Rowland
Dudley Brown

Alexander Dow.
Inventor
By Attorneys

A. DOW.
PNEUMATIC TIRE.
APPLICATION FILED JULY 16, 1913.

1,120,915.

Patented Dec. 15, 1914.
2 SHEETS—SHEET 2.

Witnesses:
Edward Rowland
Dudley Browne

Alexander Dow
Inventor
By Attorneys

UNITED STATES PATENT OFFICE.

ALEXANDER DOW, OF NEW YORK, N. Y., ASSIGNOR TO HELIX TUBE CO., INC., A CORPORATION OF NEW YORK.

PNEUMATIC TIRE.

1,120,915.  Specification of Letters Patent.  Patented Dec. 15, 1914.

Application filed July 16, 1913. Serial No. 779,383.

*To all whom it may concern:*

Be it known that I, ALEXANDER DOW, a citizen of the United States of America, and a resident of New York city, county and State of New York, have invented certain new Improvements in Pneumatic Tires, of which the following is a specification.

My invention relates to an improvement in pneumatic tires and has particular reference to a means for preventing the escape of the air from the interior of the tire after the outer shoe or casing bursts from the internal pressure.

Broadly speaking, the subject matter of my invention pertains to a means of giving to the tire a reserve capacity, by embodying in its elements capable of resisting the pressure of the confined air and preventing its escape, which elements are under no tension or bursting stress in any direction and only perform their function when the normal means adapted to retain the air pressure have failed.

I am aware that in the art, it is not new to incorporate in the body of the shoe or inner tube, layers of fabric to give increased strength. In order, therefore, to make clear the full meaning of my invention, it will be necessary for me to differentiate this present invention from others of a class, which may at first appear to contain somewhat the same elements.

My invention consists in incorporating in the casing, or in the inner tube, or in a separate means, such as an inside tire protector located between the contained air and the working fabric of the outer casing, layers of fabric capable of resisting the air pressure, but which have no tension whatever upon them in any direction at any point when the tire is normally inflated and in use. In consequence of this, these layers of fabric remain at all times in reserve, without any stress upon them, and assume and resist the pressure of the contained air, and prevent its escape at the particular point where the working fabric of the outer shoe or casing has failed and opened up as the result of wear or of being weakened from any cause.

My invention, therefore, consists in incorporating supplementary layers of fabric in the tube, or shoe, or protector, which are normally slack at all points in all directions, with no tension upon them in consequence of the pressure within the tire. The air pressure is retained within the tire by the tension of other working layers of fabric, and when these latter fail, the air cannot escape on account of the strength of these supplementary layers of fabric which immediately assume a condition to resist the explosive force of the retained air, at the place where the working fabric has failed, and thus preserve the rubber of the inner tube from rupture.

The advantages of this construction lie in the fact that the reserve supplementary layers of fabric are only under tension after the working layers of fabric have failed and parted, and are capable, in view of the fact that no stresses have been previously put upon them, of withstanding the full pressure within the tire.

Referring to the prior state of the art, I find inner tubes containing concentric layers of fabric. When an inner tube of this character in inflated within a tire, it is obvious that being compressed against the interior of the casing, it becomes a unit with it, and the layers of fabric are continually under tension from the pressure of the air, and the tube thus simply performs the function of adding a certain amount of strength to the casing, and in consequence, when the tire is sufficiently weakened, the casing and tube explode simultaneously. In my invention, however, when the outer casing fails, evidence of the fact is apparent from the exterior, and the casing can be removed and repaired at the convenience of the operator, as the tire will still remain intact, and the inconvenience of an immediate change of tires will not be necessary.

In incorporating the layers of fabric in the inner tube in accordance with my invention, it is essential that the fabric be arranged in such a manner that under the pressure of the air the inner tube will expand freely in all directions, laterally and circumferentially, until checked by the walls of the casing and that thereafter the tube can freely expand at all points in every direction a certain extent if the walls of the casing become ruptured. Under these circumstances all the pressure of the air is resisted by the working casing which envelops the tube and when this casing fails, a further slight enlargement of the inner tube at any point is possible, after which its reserve capacity acts and its further enlargement is limited by the tension of the fabric incorporated in it. One method of laying this reserve fabric in a manner to permit it to extend without stress in all directions is to compose it in corrugated layers which run in a diagonal to the plane of the circumference of the tube, the angle of the diagonal being determined by the proportion of lateral extension to circumferential extension which may be most desirable; further a certain amount of elasticity along the crests of the corrugations may be given by laying the bias of the weave in line with the crests of the corrugations.

In the ordinary practice of the manufacture of inner tubes, they are rolled and cured on straight mandrels, or poles, and then bent into a circular form and the ends joined. In order that the tube may take this circular form the rubber on the exterior is compelled to stretch and on the interior to be compressed. If within this rubber straight elements of fabric exist in planes of the circumference the outer portion cannot expand and a wrinkling of the inner side of the tube follows. Sufficient elasticity can be given to the fabric to bend without wrinkling by making the corrugations on a diagonal as described above, the amount of relative lateral and circumferential extension being predetermined by their obliquity to the plane of the circumference. It is clear that were the corrugations in the plane of the circumference no circumferential extension without stretching of the fabric would be possible, and with the corrugations at right angles to this plane, no lateral extension could exist, but by applying the folds, or plaits, or corrugations as described any desired slackness can be made in both directions simultaneously. This oblique laying of the fabric plaits also permits of the inner tube containing it to adjust itself circumferentially sufficiently to fill with proper slack casings of different inside diameters. This condition is of the utmost importance, in that any strands of the fabric which are in a tense condition when inflated, and not possessing slack, are likely to be severed when the casing parts, and the explosion of tube and shoe will be simultaneous.

I have illustrated my invention in the accompanying drawings, designating the parts by numerals, referring to like parts by like numerals.

Figure 2:
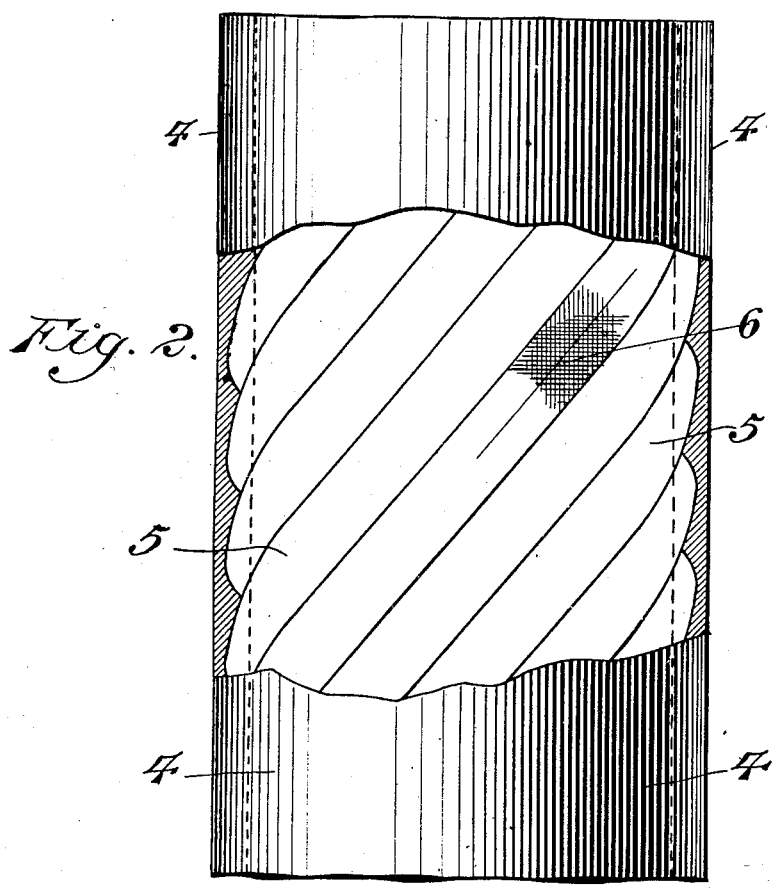
Figure 3:
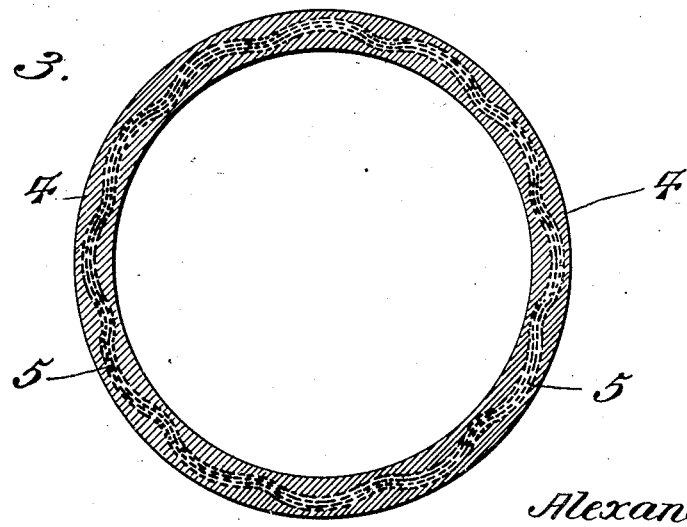

In these drawings, Figure 1 is a section of a pneumatic tire containing an embodiment of my invention; Fig. 2 is a plan view of the inner tube, under inflation, partly in section, showing the fabric laid with spiral corrugations within it; Fig. 3 is a cross section of the inner tube containing within it layers of reserve fabric.

In Fig. 1, 1 is the ordinary type of automobile casing or outer cover attached to the rim 2, upon the wood felly 3. 4 shows the inner tube inflated within the casing 1. Incorporated within the body of the inner tube 4 is the series of corrugated layers of reserve fabric 5, which normally under the pressure of the contained air lie in a continuous wavy band within the tube with no tension upon them.

In Fig. 2, is shown the inner tube, in plan, 4, and within the rubber of the tube is shown at 5 the corrugated layers of fabric running in a spiral about the tube. 6 shows the laying of the weave of the fabric with the diagonal or bias in line with the crests of the corrugations.

In Fig. 3, the inner tube 4 is shown in cross section, with the corrugated fabric layers 5 in a wavy band in the interior of the rubber of the tube.

While the attached drawings show the fabric as contained within the tube, it may be either on the exterior, with the hollows filled in, or on the interior, as would be the case if the tube was rolled on a corrugated mandrel, with the fabric laid on first.

In constructing an inner tube of this character, the periodicity and amplitude, as well as the obliquity, of the corrugations can be calculated by a determination of the percentage of slack both lateral and circumferential desired in the inner tube when the tire is inflated. An important advantage to be gained by having the reserve fabric not under tension as the result of the air pressure, arises from the fact that the corrugations of the fabric permit of a free distortion of the rubber of the inner tube, without exercising any tangential or shearing stress between the rubber and the fabric, and in consequence there results no tendency for the fabric and rubber of the inner tube to separate.

I realize that considerable variation is possible in the method of laying the fabric within the tire without departing from the spirit of my invention, and I do not, therefore, intend to limit myself to the specific arrangement here shown and described for incorporating the reserve fabric in the tire.

It is immaterial whether these spiral corrugations be regular or irregular, the purpose of their particular arrangement being to afford a universal slack condition of the reserve fabric adjacent to any point where the working fabric may part, which reserve fabric can then most readily become under tension and prevent further expansion of the tube.

Having set forth the nature and objects of my invention what I claim and desire to secure by Letters Patent is:

1. An inner tube for a pneumatic tire having smooth curved inner and outer surfaces formed of rubber having a ply of corrugated reserve fabric embedded therein and extending through the entire body portion thereof, the fabric being normally free from tension and the corrugations extending diagonally about the tube to permit extension in all directions under abnormal circumstances.

2. An inner tube for a pneumatic tire having smooth curved inner and outer surfaces formed of rubber having a series of corrugated layers of reserve fabric embedded therein and extending through the entire body portion thereof, the fabric being normally free from tension and the corrugations extending diagonally about the tube to permit expansion in all directions under abnormal circumstances.

3. An inner tube for a pneumatic tire formed of rubber and having embodied therein a ply of fabric arranged in a corrugated layer the corrugations extending diagonally about the surface of the tire.

4. An inner tube for a pneumatic tire formed of rubber and having embodied therein a ply of fabric arranged in a corrugated layer the corrugations extending diagonally about the tire, with the diagonal of the weave of the fabric extending along the crest of the corrugations.

5. An inner tube for a pneumatic tire formed of rubber and having embodied therein layers of fabric arranged in corrugated layers the corrugations extending diagonally about the surface of the tire.

6. An inner tube for a pneumatic tire formed of rubber and having embodied therein layers of fabric arranged in corrugated layers the corrugations extending diagonally about the surface of the tire, with the diagonal of the weave of the fabric extending along the crest of the corrugations.

In testimony whereof I affix my signature in presence of two witnesses.

ALEXANDER DOW.

Witnesses:
   JAMES W. TRAVERS,
   JAMES A. ST. JOHN.